United States Patent Office 3,401,099
Patented Sept. 10, 1968

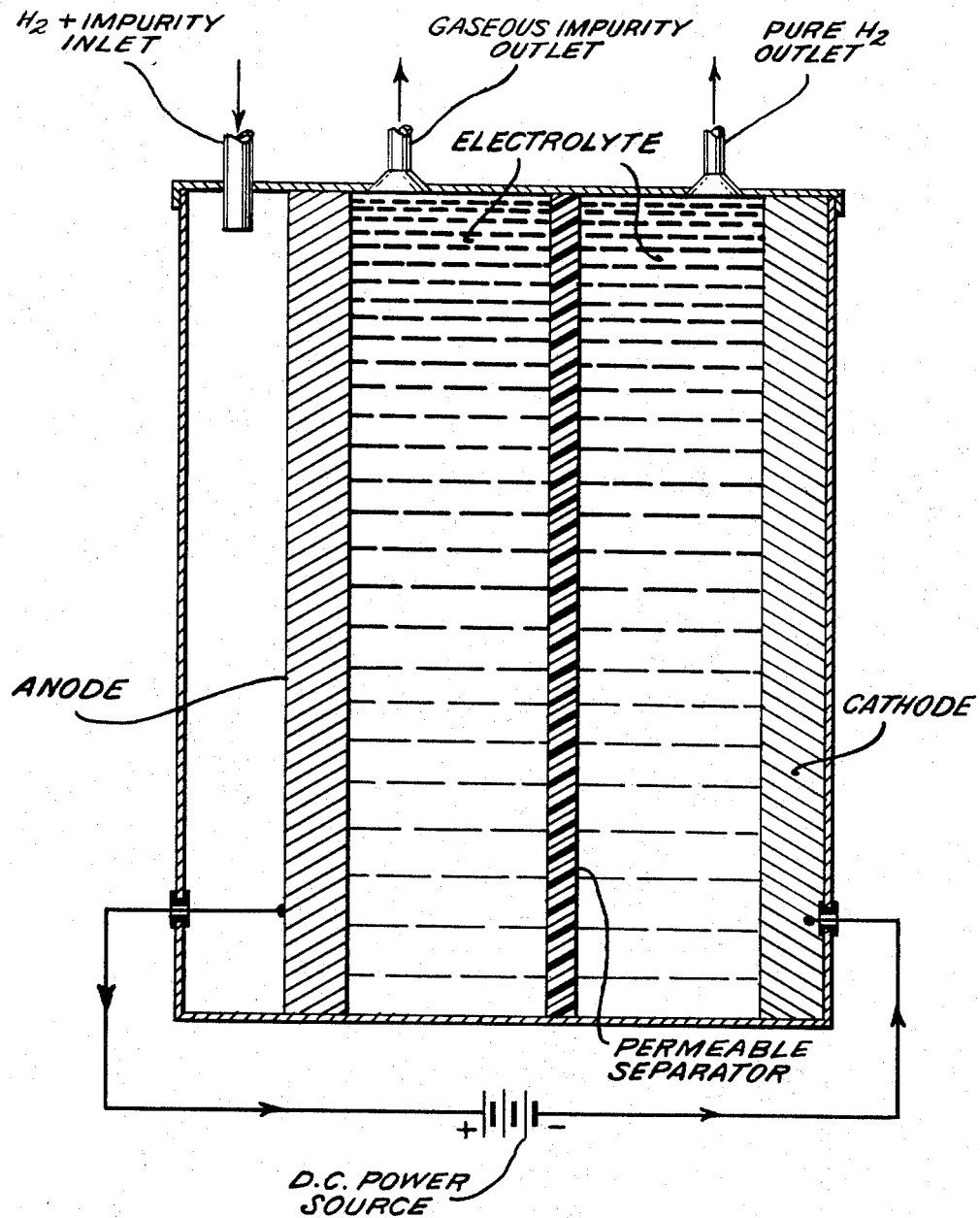

3,401,099
ELECTROLYTIC METHOD OF GAS SEPARATION
James E. McEvoy, Morton, Pa., assignor to Air Products and Chemicals, Inc., Philadelphia, Pa., and Northern Natural Gas Company, Omaha, Nebr., both corporations of Delaware
Continuation-in-part of application Ser. No. 215,387, Aug. 7, 1962. This application Apr. 27, 1966, Ser. No. 549,769
7 Claims. (Cl. 204—129)

This application is a continuation-in-part of Ser. No. 215,387, filed Aug. 7, 1962, now abandoned.

This invention relates to the separation of hydrogen or oxygen from gas streams containing carbon dioxide, nitrogen, helium, methane, ethane, propane, butane, ethylene, propylene, butylene or other similar diluents by a low energy input electrochemical process. More particularly, the invention relates to a process for the separation of pure hydrogen or oxygen by the removal of gaseous contaminants from a hydrogen- or oxygen-containing stream at ambient temperature and atmospheric pressure using very small quantities of electrical energy.

In general, hydrogen is generated or produced either as a reaction product or as a decomposition product. For example, some of the principal methods for the production of hydrogen include (a) the electrolytic process, in which hydrogen is obtained by the electrolysis of water or as a byproduct in other electrochemical processes such as the electrolysis of aqueous solutions of sodium chloride; (b) the hydrocarbon decomposition process, e.g., the decomposition of methane; (c) the steam-methanol process; (d) the steam-iron process; (e) the water-gas process; (f) the non-hydrocarbon dissociation process, e.g., the dissociation of anhydrous ammonia; (g) the steam-hydrocarbon process utilizing natural gas or propane and (h) the partial oxidation processes. Oxygen, on the other hand, is usually obtained by fractionation from liquefied air.

With the exception of the electrolytic production of hydrogen and oxygen, almost all hydrogen and oxygen is first produced in an impure form. Since processors, in increasing numbers, need ultra-pure (99.9%) hydrogen and oxygen considerable attention has focused on the processes for hydrogen and oxygen purification.

The separation or purification of hydrogen or oxygen from gas streams which contain carbon dioxide, nitrogen, helium, $C_1$ to $C_4$ alkanes, $C_2$ to $C_4$ alkenes, and other similar gaseous substances has classically been done by "scrubbing" with materials such as caustic soda, potassium carbonate, alkali metal chlorides, copper liquor, water (under pressure), monoethanolamine or triethanolamine. Low temperature processes employing fractionation of gases and washing with liquid nitrogen have also been used extensively. More recently, solid adsorption techniques and membranes have been developed for the separation of one gas in preference to another. A palladium-silver membrane, for example, has been developed which will "pass" hydrogen only, at a rate dependent on temperature, pressure and many other variables.

The hydrogen or oxygen obtained by these and other numerous purification procedures heretofore employed is of varying degrees of purity. One of the principal problems with such procedures has been the prohibitive cost for operations capable of producing hydrogen or oxygen of electrolytic grade purity—attributable in most cases to the expensive and complicated equipment; the necessity of regular and frequent shutdowns to decontaminate apparatus and the number of cycles required for the desired purity, i.e., number of times which the procedure must be repeated. It has been particulary difficult to obtain either pure hydrogen or pure oxygen from an impure feed in relatively small volume for a reasonable capital investment and at product costs competitive with bulk prices. This latter problem has been most apparent where the requirements for small amounts of extremely pure hydrogen or oxygen has been the greatest, e.g., for precise laboratory and demonstration work, for use in hospitals, for use on ships, for certain technical phases of industry and for certain military applications.

It is therefore an object of this invention to provide means for the separation of high purity hydrogen or oxygen from gas streams without expensive and complicated apparatus.

It is a further object to provide a method capable of long, continuous use having a relatively low investment, low operating cost framework.

It is still another object to provide a procedure for the separation of ultra-pure hydrogen or oxygen from gas streams which procedure is readily adaptable for either laboratory or large scale commercial purposes.

A further object is to provide a relatively inexpensive method for the purification of hydrogen or oxygen at ambient temperature and atmospheric pressure.

Other objects will become apparent from the description hereinafter developed and consideration of the drawing.

In general, the objects of this invention are obtained in an electrochemical system wherein hydrogen or oxygen, a component of a gas mixture comprising hydrogen or oxygen in admixture with at least one gaseous contaminant, is selectively ionized and moved by a minimum electromotive force to a deionization area, separated from the ionization area by gas impermeable, ion permeable means, from which deionization area essentially pure hydrogen or oxygen is recovered. In particular, the electrochemical system, which comprises an electrochemical cell, an ion permeable separator impervious to gas passage dividing the cell into at least two regions and an electrode in each separate region, is characterized in having a homogeneous electrolyte.

The homogeneous electrolyte is an important feature in the operation of this invention. It is to be understood that the very nature of the invention during operation creates within each sectionalized portion of electrolyte a minor deviation from true homogeneity but any disparity is of such minor degree that its effect, while acknowledged, can be considered simply as with the term "homogeneous". The homogeneous electrolyte composition has a marked and important effect on the operation of the system, which effect is mainly reflected in the reduction of outside current input for driving the mechanism to a practical minimum.

There are several types of electrical demand involved in the described system. The sum of these demands, naturally, is reflected in the total electrical demand for successful operation. Ignoring, for the moment, other factors of internal and external resistances and the like, the effect of electrolyte homogeneity is considered. Each pH unit is equivalent to approximately 60 millivolts in resistance value, thus an acid pH of 0 on one side of the separator and a basic pH of 14 on the other side of the separator immediately adds an internal resistance of about 0.84 volt. This resistance, by reverse analogy, is at a minimum when the electrolyte is homogeneous, even in the sense of electrolyte of equal pH although of different composition in each of the catholyte and the anolyte regions.

In operation, there is employed at least one electrochemical cell containing electrolyte and having at least two electrodes. A source of DC power is connected across the electrodes to supply current. An impure gas stream containing hydrogen or oxygen is then introduced along or into one or more porous electrodes. Hydrogen or oxygen is selectively removed from the impure gas stream by chemisorption, dissociation and ionization at an anode or cathode, respectively, to form ions which are transported through the electrolyte under a slight potential gradient to a counter-electrode where deionization releases pure hydrogen or oxygen. Gaseous contaminants have a far higher dissociation requirement than either hydrogen or oxygen and are not ionized at the appropriate electrode. Said contaminants are emitted from gaseous impurity outlets while high purity hydrogen or oxygen is recovered from outlets at the appropriate counter-electrodes in the electrochemical cell. An important feature of this process is that the only item consumed is electrical energy, i.e., neither the electrodes nor the electrolyte is consumed or chemically altered. Another feature is the fact that the process of this invention may be operated continuously or, if desired, as a batch-type system for the purification of a given quantity of gas.

The purification system of this invention can be contrasted to fuel cells in which a fuel such as hydrogen is oxidized at the anode and an oxidant such as oxygen is reduced at the cathode with the over-all production of electricity. As previously mentioned, the described purification system must also be distinguished from systems for the production of hydrogen or oxygen. For example, on the basis of the required electric potential alone, in commercial practice the electrolysis of water requires 2.0 to 2.5 volts (theoretical voltage 1.23) compared to 0.1 to 0.7 volt required for the present invention.

The invention is illustrated by reference to the schematic drawing showing a particular preferred embodiment of an electrochemical cell having two electrodes. It is manifest that the dimensions of the cell illustrated by this schematic drawing may be modified to meet widely varying requirements of purification. It should also be apparent one or more cells can be connected in series or in parallel. While the drawing shows the anode as separating a gas chamber from the electrolyte there is no reason why electrolyte could not be present on both sides of the anode. Accordingly, the anode may have channels permitting the presence of electrolyte on both sides thereof. Features, such as means for removing and replacing electrodes and electrolyte, have been omitted in the schematic illustration. Aside from the openings required for the introduction and removal of particular gas streams, the electrochemical cell is closed during operation. It is also to be noted that for the purpose of clarity, the drawing and the following description refer to hydrogen separation. Obviously, the same general technique can be used for oxygen separation by the introduction of the oxygen-containing gas stream to the cathode instead of the anode. The latter technique provides a convenient means for obtaining high purity nitrogen (in addition to oxygen) when air is employed as the gas stream.

Referring to the drawing, hydrogen is introduced ($H_2$+Impurity Inlet) in a gas stream, which for purposes of illustration contains carbon dioxide as an impurity (the molar ratio of carbon dioxide to hydrogen being 3 to 1), at ambient temperature to a catalytic gas diffusion electrode (Anode). Said anode is separated from another catalytic gas diffusion electrode (Cathode) by 30% sulfuric acid (Electrolyte). An ion permeable membrane (Permeable Separator) separates the electrolyte into two portions. The electrodes are made, according to the method set forth in U.S. Letters Patent 3,097,474, by impregnating a porous carbon matrix with a liquid suspension of finely divided high surface area activated carbon impregnated with platinum. Following the impregnation of the electrode matrix with the suspension, the electrode is dried and then reduced with hydrogen at ambient temperature. A source of DC power (D.C. Power Source) is connected across the electrodes to supply current to the cathode. By connecting an ammeter (not shown) in this external circuit in series with the cell, the amount of hydrogen being purified can be determined from the current. Gaseous contaminants are emitted and collected from an outlet (Gaseous Impurity Outlet) at the anode while electrolytic grade hydrogen is recovered from an outlet (Pure $H_2$ Outlet) at the cathode.

Equations for the half-cell reactions of a single purification cell are:

Anode:

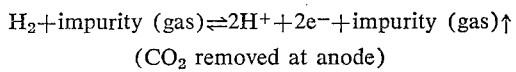

($CO_2$ removed at anode)

Cathode:

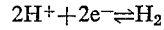

(Pure $H_2$ removed at cathode)

Since the reaction is completely reversible, $H_2 \rightleftharpoons 2H^+ + 2e^-$, a minimum of potential gradient for the transport of ions is required and depends on the efficiency of the catalytic electrodes plus the sum of the electrolytic and catalytic resistances, i.e., circuit resistances, electrolytic resistances and activation polarization losses. Thus, in a cell, as hereinabove described, in which the total activation polarization losses are 0.06 volt, operating at ambient temperature, atmospheric pressure and current densities between 100 and 200 amps/sq. ft. of electrode area, only 4.0 kwh. of electrical energy would be required to process 1000 standard cu. ft. of hydrogen.

While the purification system of the present invention may be employed for the separation of hydrogen or oxygen from an impure gas stream containing at least 10% by volume of hydrogen or oxygen, optimum results are obtained when the concentration of the hydrogen or oxygen in the impure gas stream is 70% by volume or higher. As emphasized above, one of the advantageous features of the described system is its ability to operate at ambient temperatures and at atmospheric pressure. If desired, however, this system may be operated at temperatures between 0 and 300° C. and preferably between about 0 to about 80° C. and at pressures between 1 to 1000 p.s.i.a. and preferably between 1 to 500 p.s.i.a.

While an important part of the economic justification of the present process is due to the electrodes described in U.S. 3,097,974, others may be employed. Either the anode or the cathode may, e.g., be manufactured of porous carbon, graphite, nickel, silver, iron, etc., provided they are electrically conductive and resistant to corrosion by the electrolyte. On the surface or internally, they should contain catalytic materials; said catalytic materials generally being Group VIII metals of the Periodic System and in particular palladium and platinum. Other useful catalytically active metals include silver, titanium, tungsten, molybdenum and zirconium. Even non-porous, perforate catalytically active electrodes can be used.

It is contemplated, that the electrodes, for most practical purposes, will have the final form of thin plates, e.g., strips or discs. They may, however, be of any other desirable shape, such as in the form of a curved, tubular or cylindrical body.

The preferred electrolyte is 30% sulfuric acid but any other acidic material capable of transferring hydrogen ions, e.g., a paste or an ion-exchange membrane, may be used. A satisfactory paste electrolyte may be formed by mixing phosphoric acid with approximately 65% by weight of silica powder. Binary or ternary mixtures of sodium, lithium and/or potassium carbonates can be used but are less effective. It has also been found that an alkali electrolyte, such as 34% KOH, may be employed. A suitable eutectic mixture may be formed by mixing NaOH and KOH having approximately 50% by weight of NaOH. If electrolyte in the form of a paste is desired, approximately 20% by weight of Ca(OH)$_2$ may be added to the eutectic alkali mixture. Regardless of the particular electrolyte employed, it is important to note that all of the electrolyte for any electrochemical cell is identical on both sides of the permeable separator.

The permeable separator may simply be a screen which will act as a barrier for the gaseous impurities or may be an ion permeable membrane. Ion permeable membranes are of two general types: viz., membranes such as dialysis membranes which are permeable to both anions and cations, and permselective membranes such as cations permeable membranes made from an acid exchange resin and anion permeable membranes comprising a basic resin. Originally, membranes of natural ion exchange materials were used. Specifically, the cation exchange membranes were modified cellophane and the anion exchange partitions were of either leather or pig gut. These, however, were of very low exchange capacity. New synthetic ion permeable resins of very high capacities and consequently excellent ion selectivity are now employed. Arylsulfonic acids are used almost exclusively as the fixed charges for cation-permeable membranes because films of this type the relatively easy to prepare and the group is quite stable. Anion-exchange resins are invariably of the quaternary ammonium type, their fixed groups being of the benzyl-trimethyl-ammonium or the imidazolium types. The nature of the backbone or matrix polymers used in the membranes is an important factor in their chemical stability. Polystyrene is generally favored because of its stability and ease of chemical substitution. However, other matrix polymers such as polyacrylonitrile, polyethylene and polyvinylchloride are commonly used and are of high stability. Membrane films may be employed which have thicknesses ranging from about 1 to about 250 microns. The thinner films are likely to be quite fragile and must be supported by a fine grid.

Such synthetic ion permeable membranes are described in the literature. Reference is made, for example, to Juda et al., Journal of American Chem. Soc., vol. 72, page 1044 (1950); Juda et al., Journal of American Chem. Soc., vol. 74, page 3736 (1952) and Clark et al., Journal of Physical Chem., vol. 56, page 100 (1952). Typical cation permeable membranes include: sulfonated polystyrene; Nepton CR-61, having a functional sulfonic group; colloidal clay (bentonite and montmorillonite) membranes; hydrated zeolitic membranes; membranes prepared by embedding granular Amberlite IR-100 in a plastic binder such as polystyrene and Permionic CR-41, a cross-linked phenol sulfate resin membrane. Typical anion permeable membranes include: Permionic ARX-44 and Nepton AR-111, having functional quaternary and tertiary amine groups.

While the invention can be used to separate hydrogen or oxygen from any diluent gas, economic aspects dictate that the diluent must not be such that it adversely affects the operation of the electrodes. Hydrogen sulfides gas, e.g., if present in a hydrogen stream will "poison" the anode and hence cause a decrease in the efficiency of said anode for activation of hydrogen. Carbon monoxide will act as a temporary "poison." Accordingly, deleterious materials such as these should be removed from the gas stream prior to introduction of said stream into the electrochemical cell. Treatment of gas streams for the removal of such materials is well known in the art and does not specifically form part of the present invention.

Obviously, many modifications and variations of the invention as hereinbefore set forth may be made without departing from the spirit and scope thereof, and therefore only such limitations should be imposed as are indicated in the appended claims.

What is claimed is:

1. A method for the separation and recovery of a gas having electrolytic grade purity selected from the group consisting of hydrogen and oxygen from a gas stream which also contains less than about 90% by volume of gaseous contaminants and in which the gaseous contaminants therein are selected from the group consisting of carbon dioxide, nitrogen, helium, $C_1$ to $C_4$ alkanes and $C_2$ to $C_4$ alkenes, which method comprises:
    (a) transmitting such a contaminant-containing gas stream into contact with a first electrode of an enclosed electrochemical cell, said cell containing at least two catalytic electrodes, including a second counter electrode of opposite sign from said first electrode, and a homogeneous electrolyte capable of transferring ions in contact with said electrodes, and wherein said electrodes of opposite sign are separated by a gas-impermeable, ion permeable membrane,
    (b) supplying an electromotive force from a D.C. power source at a full cell potential of about 0.1 to about 0.7 volt across the electrodes of opposite sign, said voltage being less than the voltage required to electrolytically decompose water into its elements,
    (c) effecting by said contact at said first electrode selective dissociation and ionization of substantially only the component of the gas stream to be recovered in electrolytic grade purity, said ionization being effected without substantial change in the homogeneity of the electrolyte,
    (d) moving the obtained ions in said electrolyte through said gas-impermeable, ion permeable membrane by the aforesaid electromotive force of (b) and effecting thereby separation of ionized from non-ionized components of the gas stream;
    (e) deionizing said separated ions by contact with the second counter electrode in said electrolyte and re-forming gas product of electrolytic grade purity,
    (f) removing said non-ionized gaseous contaminants from contact with said first electrode, and
    (g) recovering the re-formed gas product, such ionization, separation, re-forming and recovering being thus effected without consumption or chemical alteration of said electrodes or of said electrolyte and with consumption of only the electrical energy supplied.

2. The method according to claim 1 wherein the gas to be separated is hydrogen.

3. The method according to claim 1 wherein the gas to be separated is oxygen.

4. The method of claim 2 wherein the electrolyte is 30% sulfuric acid and the electrochemical cell is operated at ambient temperature and atmospheric pressure.

5. The method of claim 1 wherein at least one of the electrodes is prepared from porous carbon coated with a liquid suspension of finely divided activated carbon impregnated with a noble metal catalyst.

6. The method of claim 1 wherein the electrochemical cell is operated at a temperature between 0 to 80° C. and at a pressure of 1 to 500 p.s.i.a.

7. The method of claim 1 wherein less than about 30% by volume of gaseous contaminant is present in the stream transmitted to the electrochemical cell.

References Cited

UNITED STATES PATENTS

| 2,749,293 | 6/1956 | Wahlin | 204—129 |
| 3,103,473 | 9/1963 | Juda | 204—1.06 |
| 3,124,520 | 3/1964 | Juda | 204—129 |

FOREIGN PATENTS

| 303,027 | 10/1929 | Great Britain. |

OTHER REFERENCES

Mantell: "Electrochemical Engineering," 4th edition, 1960, pp. 55 and 308.

JOHN H. MACK, *Primary Examiner.*

H. M. FLOURNOY, *Assistant Examiner.*